W. KOEDDING AND W. J. LEMP.
PROCESS OF DEALCOHOLIZING LIQUIDS.
APPLICATION FILED FEB. 21, 1917.
1,351,521. Patented Aug. 31, 1920.
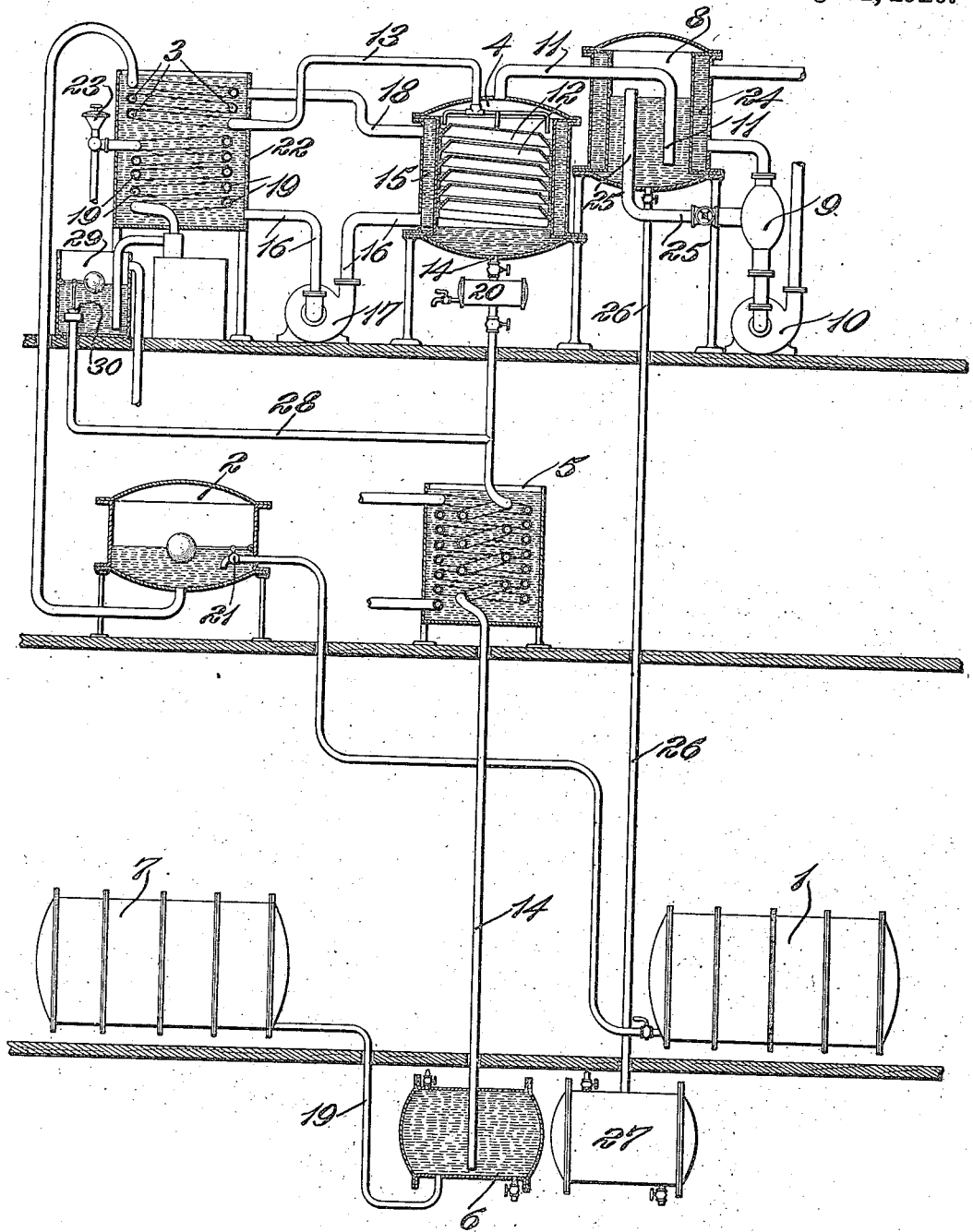
INVENTORS:
William Koedding,
and William J. Lemp,
by Carr & Carr
THEIR ATTORNEYS.

UNITED STATES PATENT OFFICE.

WILLIAM KOEDDING AND WILLIAM J. LEMP, OF ST. LOUIS, MISSOURI.

PROCESS OF DEALCOHOLIZING LIQUIDS.

1,351,521.     Specification of Letters Patent.     Patented Aug. 31, 1920.

Application filed February 21, 1917. Serial No. 150,024.

*To all whom it may concern:*

Be it known that we, WILLIAM KOEDDING, a citizen of the United States, and a resident of the city of St. Louis and State of Missouri, and WILLIAM J. LEMP, of the county of St. Louis and State of Missouri, have invented a new and useful Process of Dealcoholizing Liquids, of which the following is a specification.

Our invention relates to a process of dealcoholizing liquids and is of special importance in de-alcoholizing beer, ale, and similar liquors.

The principal objects are to provide for continuity of operation, to effect the operation at a temperature sufficiently low to avoid impairing the liquid, to insure the maintenance of a proper degree of vacuum, to provide for supporting the foam formed in the evaporating chamber in proper relation to the main stream of liquid undergoing treatment, to provide for the liberation of the vaporized alcohol from the foam formed above the main stream of liquid as well as from the main stream itself, and to replace any water that may be lost by distillation.

The accompanying drawing illustrates an apparatus adapted for the practice of our process. The liquid to be treated passes from a main reservoir 1 to a float-controlled feed tank 2, from which it passes through a pre-heater coil 3 to an evaporating tank 4, thence through a brine tank 5 to a collecting tank 6, and thence to a storage tank 7. These several elements, together with a surface condenser 8, an ejector condenser 9 and a centrifugal suction pump 10, arranged to maintain a high degree of vacuum in the evaporating tank, are the main elements of the apparatus. Their connections and method of operation, together with a number of secondary elements associated therewith, are hereinafter described.

The evaporating tank 4 comprises a shell, whose upper portion communicates by a pipe 11 with the surface condenser 8 which in turn is connected to the suction apparatus which is adapted to maintain a fairly high degree of vacuum in the evaporating chamber. Ordinarily, the vacuum will range from twenty-two to twenty-nine inches of mercury. Inside of the evaporating chamber is a helical trough or runway 12 of great length and slight longitudinal inclination. As beer and like liquids foam considerably in the evaporating chamber, the trough or runway therefor should be wide and deep enough to accommodate the foam as well as the body of the liquid; and as some of the evaporated alcohol is trapped by the foam, the exposure should be long enough to permit the alcohol to be liberated therefrom. For these reasons it is desirable that the channel for the liquid should have only a slight downward inclination longitudinally so as to insure a slow current and thereby prolong the exposure of the liquid to the action of heat and vacuum and allow time for the foam to be re-converted into liquid form.

At the upper end of the runway is a supply pipe 13 through which the liquid enters the evaporating tank 4, and at the bottom of the tank is the outlet pipe 14 by which the liquid is discharged. The heat is supplied by means of a water jacket. For this purpose, the wall of the evaporating tank 4 is made hollow to form an annular chamber 15. Entering this annular space tangentially near the bottom thereof, is an inlet pipe 16 which leads thereto from the water heater tank 22 through a pump 17. The outlet for this hot water from the annular chamber of the evaporating tank 4 is through a pipe 18 arranged tangentially near the top of said annular chamber, which pipe leads back to said water heater tank 22.

The outlet pipe 14 for the evaporating tank 4 extends downwardly and opens into the collecting tank 6; and this collecting tank 6 communicates through a pipe 19 with the storage tank 7. In order that the liquid may drain properly from the evaporating tank, the vertical distance from the top of the storage tank to the bottom of the evaporating tank is made thirty-three feet or more; and the collecting tank is located at a lower level than the storage tank.

In its passage from the evaporating tank 4 to the collecting tank 6, the liquid passes through a small chamber 20 which can be easily tapped for test purposes. The liquid also passes through the brine tank 5, where it is cooled almost to the freezing temperature.

The feed of the liquid to the evaporating tank is controlled automatically. For this purpose, the liquid in the feed tank 2 is kept at a pre-determined level by means of a float-controlled inlet valve 21; the feed tank being continuously replenished from the main supply reservoir 1 by gravity, air pressure or other suitable means. From the float-controlled tank 2, the liquid is drawn by suction into the evaporating tank 4. So long as the level of the liquid in the tank 2 remains constant and the degree of vacuum in the evaporating tank remains constant, the liquid will be delivered into the evaporating tank in a continuous stream of constant volume, which may be adjusted to the capacity of the apparatus.

In passing from the float-controlled tank 2 to the evaporating tank 4, the liquid passes through the pre-heater coil 3 which is immersed in the heated water of the water heater tank 22. The apparatus is preferably so designed and operated that the liquid enters the evaporating chamber at a temperature in the neighborhood of that at which the liquid will evaporate at the degree of vacuum maintained in said evaporating chamber. The water used for transmitting heat to effect preheating and evaporation is itself heated by a steam coil 19 suitably controlled by a thermostat 23. For the purpose of de-alcoholizing beer, satisfactory results are obtained with a temperature in the water jacket in the neighborhood of one hundred and ten degrees Fahrenheit, but this temperature admits of wide variation short of impairing the liquid. It is desirable to maintain as high a degree of vacuum as practicable, say about twenty-eight inches of mercury i. e., equivalent to a pressure of about two inches of mercury; but the degree of vacuum also admits of considerable variation. The temperature specified is low enough to prevent impairing the organic matter; and with the high degree of vacuum mentioned, there will be rapid foaming and ebullition of the liquid in the evaporating chamber. Assuming that the total length of the helical trough or channel in the evaporating tank or vacuum chamber 4 is in the neighborhood of four hundred feet with a fall of about four feet, practically the whole alcohol content of the beer will be eliminated in the passage through the evaporating tank 4 under the conditions mentioned. The length and slight downward slope of such a channel insure a sufficient prolongation of the exposure of the liquid to the action of heat and vacuum not only to evaporate the alcohol therefrom but also to allow the alcohol trapped in the foam to become liberated therefrom. Thus, there is a main stream of liquid which is being continuously replenished along the channel by the breaking of the relatively stationary bubbles above the main stream. From time to time, a small quantity of the treated liquid may be drawn off from the testing chamber for the purposes of test. If it is found that the treated liquid still contains too large a proportion of alcohol, the pressure may be lowered, (i. e., the degree of vacuum may be increased), the temperature may be increased, or the flow of liquid may be decreased, to bring them into harmony.

The condenser illustrated in the drawing is a surface condenser of a well-known type. It comprises a tank having an annular water jacket 24, into the upper end of which jacket enters a pipe leading from a suitable source of cold water supply. At the lower portion of this water jacket is the outlet pipe which passes through the ejector-condenser 9 and thence to the centrifugal pump 10. In the side of the ejector-condenser opens a valved pipe 25 which extends through the bottom of the surface condenser 8 and to a pre-determined height in the interior thereof. The suction pipe 11 leading from the evaporating tank 4 extends through the side of the surface condenser 8 and terminates in the lower portion thereof. In the bottom of the surface condenser 8 is a valve delivery pipe 26 which communicates with a suitably arranged collection tank 27. In the apparatus illustrated in the drawing, this collection tank is located on a level thirty-three feet or more below the surface condenser in order to permit the liquid of condensation to run off by gravity.

In the practical operation, a continuous current of cold water is forced through the water jacket of the surface condenser and through the ejector condenser 9. In the apparatus illustrated in the drawing, the water is passed also through the pump 10 by which it is forced to an elevated position to a cooling device and tank, liberating the non-condensable gases and again supplementing the supply of water that feeds the water jacket. A high degree of suction is thus maintained in the pipe that opens into the upper portion of the surface condenser 8, and also a high degree of vacuum in the evaporating tank 4 connected therewith. As the liquid in the evaporating tank 4 is heated above its boiling point for the degree of vacuum therein, it foams and boils vigorously, and the alcohol content thereof is evaporated therefrom. At the same time, however, some of the liquid is evaporated and carried over with the alcohol vapor into the cool condensing chamber, where the condensable portions are condensed and accumulate in the lower portion of the tank, whence they are drawn off and the valuable portions thereof recovered directly or by further treatment. The uncondensed gases pass out through the ejector condenser. Obviously, it is not desirable to prolong the treatment beyond the time required to eliminate the alcohol.

The water evaporated from the liquid may be made good by means of a pipe 28 leading from any suitable source of water supply, preferably distilled water. For instance, in the apparatus illustrated, the outlet of the steam pipe 19 of the water heater tank 22 opens into a tank 29; and the water in this tank, due to the condensation of the steam, is kept at a constant level by means of a float which controls a valve 30 in the discharge pipe therefrom, which discharge pipe opens into the main discharge pipe 14 above mentioned. Broadly speaking, this contrivance restores to the liquid an amount of water fairly equivalent to that lost by evaporation; but it is not claimed that the amount restored to the liquid is accurately equal to the amount lost by evaporation.

In the process of treating carbonated beverages, most of the carbon dioxid content thereof escapes in the supply tank 2 or elsewhere before reaching the evaporating chamber; and it may be desirable to recarbonate the treated liquid to extent desirable. For this purpose, the treated liquid may be charged with carbon dioxid at any convenient stage.

Except for the fact that the alcohol has been eliminated therefrom, the product resulting from the treatment of beer, ale, and similar beverages by the process hereinbefore described retains all of the nutritive properties of the initial beverage; and as the liquid is treated in a continuously moving stream, it retains much of its characteristic flavor.

We claim:

1. The process of de-alcoholizing liquids of the kind described which consists in maintaining a fair degree of vacuum in a chamber, and maintaining around said chamber a heated water jacket of a substantially uniform temperature somewhat above that required to evaporate the alcohol of said liquid, preheating said liquid in a pipe system approximately to said temperature and then passing said liquid through said chamber in an open channel of substantially sufficient length and sectional area to accommodate both the liquid and the foam formed therefrom for a period sufficient to permit the foam to be re-converted into liquid form.

2. The process of de-alcoholizing liquids of the kind described which consists in preheating said liquid to approximately the temperature at which the liquid boils at the pressure of the vacuum chamber and then passing said liquid through said vacuum chamber in a channel of sufficient length and sectional area to accommodate both the liquid and the foam formed therefrom for a period substantially sufficient to permit the foam to be re-converted into liquid form, the temperature of the vacuum chamber being maintained sufficiently high to evaporate the alcohol from said liquid.

3. The process of de-alcoholizing liquids of the kind described which consists in maintaining a fair degree of vacuum in a vacuum chamber, heating the liquid in a pipe system to a temperature somewhat in excess of that required for evaporation in said vacuum chamber and then passing said liquid in a continuous stream slowly through said chamber, and maintaining the liquid while passing through said chamber at a temperature high enough to evaporate most of the alcohol but low enough to avoid impairing the other contents of said liquid.

4. The process of de-alcoholizing beer and similar liquids which consists in maintaining in a vacuum chamber a substantially uniform pressure equivalent to about two inches of mercury, and passing the beer through said chamber in a long channel having a low degree of inclination and of sufficient capacity to accommodate both the liquid and the foam formed therefrom, said channel being exposed throughout its length to a mass of water of sufficient volume kept in circulation past a source of heat at sufficient velocity to maintain the heat exchanging portion of the water at a substantially uniform temperature in the neighborhood of one hundred and ten degrees Fahrenheit.

5. The process of de-alcoholizing beer which consists in maintaining a fair degree of vacuum in a chamber and maintaining around said chamber a heated water jacket of substantially uniform temperature sufficient to effect the ebullition of the beer but low enough to substantially prevent impairing the organic matter thereof, preheating said beer in a pipe system to approximately said temperature and then passing said beer through said chamber in an open channel of substantially sufficient length and sectional area to accommodate both the beer and the foam formed therefrom for a period sufficient to permit the foam to be reconverted into liquid form.

6. The process of de-alcoholizing beer which consists in maintaining a fair degree of vacuum in a vacuum chamber, heating the beer in a pipe system to a temperature in the neighborhood of that required for evaporation in said vacuum chamber and in passing said beer in a continuous stream slowly through said chamber, and maintaining the beer while passing through said chamber at a temperature high enough to evaporate most all of the alcohol but low enough to avoid impairing the other contents of the beer.

Signed at St. Louis, Missouri, this seventeenth day of February, 1917.

WILLIAM KOEDDING.
WILLIAM J. LEMP.